United States Patent [19]

Mandrik

[11] 4,235,466
[45] Nov. 25, 1980

[54] BODY SIDE PROTECTIVE MOLDING

[75] Inventor: Paul Mandrik, Mt. Clemens, Mich.

[73] Assignee: International Telephone and Telegraph Corporation, New York, N.Y.

[21] Appl. No.: 660,916

[22] Filed: Feb. 24, 1976

[51] Int. Cl.² ............................................. B32B 33/00
[52] U.S. Cl. .................................................... 293/128
[58] Field of Search .................................. 293/63–69, 293/88, 21, 62, 95, DIG. 4, 71 R, 128, 126

[56] References Cited

U.S. PATENT DOCUMENTS

| | | | |
|---|---|---|---|
| 3,359,030 | 12/1967 | Newman | 293/54 D |
| 3,572,799 | 3/1971 | Truesdell et al. | 293/1 |
| 3,606,431 | 9/1971 | Kunevicius | 293/62 X |
| 3,791,693 | 2/1974 | Hellroegel | 293/62 X |
| 3,829,355 | 8/1974 | Ascencio | 293/62 X |
| 3,836,188 | 9/1974 | Klees | 293/95 X |
| 3,897,967 | 8/1975 | Barenyi | 293/62 X |

Primary Examiner—John J. Love
Assistant Examiner—Norman L. Stack
Attorney, Agent, or Firm—James B. Raden; William J. Michals

[57] ABSTRACT

A protective molding system for use with automotive vehicles is disclosed. The molding includes a rolled metallic carrier strip of a generally U-shaped configuration. A plastic member insert of a given surface configuration, texture and color is bonded or affixed within the U-shaped channel such as by snap-on, roll form or slide assembly with the carrier strip. The flat underside of the carrier is provided with an adhesive layer comprising a double-sided stick-on tape. The ends of the carrier strip are provided with retainers or fasteners for positive attachment to the vehicle body. The open ends of the carrier strip are closed with plastic, die-cast or forged plugs which include portions which extend into the plastic member insert. The plugs are staked from the underside of the carrier strip to provide a positive lock therein.

2 Claims, 7 Drawing Figures

BODY SIDE PROTECTIVE MOLDING

BACKGROUND OF THE INVENTION

This invention relates to a body side protective molding system for protecting the generally vertical surfaces of the sheet body of an automotive vehicle, and, more particularly, to such a system utilizing a three-piece construction which facilitates interchangeability of the ornamental portion thereof.

Body side protective moldings are well known and have been used in the art to protect the sheet metal surfaces of a vehicle body while providing a decorative or ornamental finish. One such system utilizes a unitary metallic strip, such as continuous strip of anodized aluminum and of a given cross-sectional configuration, which is mechanically fastened to the vehicle body by means of a weld stud and clip arrangement or by the conventional nut and bolt attachment. This technique has the disadvantage in that several expensive fasteners, such as weld stud and clip arrangements and the like, must be provided at regularly spaced intervals along the molding strip. Further, this technique has the overall disadvantage that a change in the molding configuration, such as to accomodate a different vehicle model, necessitates an expensive tooling change to provide the structurally different molding configuration.

Another known technique for providing protective molding strips is the adhesively applied plastic molding in which a molding body of a material such as PVC or a vinyl is applied to the vehicle by means of two-sided stick-on tape. This system has the disadvantage that the adhesive moldings are particularly sensitive to undersurface preparation which, therefore, necessitates extraordinary care during the assembling operation to avoid molding bond failure both initially and subsequently. That is, it has been found that these adhesively applied body side moldings tend to separate from the sheet metal body, particularly at the end portions of the molding, when the undersurface has not been properly prepared. Further, since these adhesively applied side moldings typically lack any means for a fixed rigid support to the vehicle body, it has been found that they develop a tendency to separate from the body as a result of the various shear forces applied to the molding during its service life. That is, even relatively low shear forces applied to the end portions of the molding strip tend to separate the molding strip from the vehicle body. Still further, where fasteners are provided at the end portions, such fasteners would be undesirably visible from the external surface thereof.

These and other disadvantages are overcome by the present invention wherein there is provided a body side protective molding system comprising a universal metallic carrier strip which is bonded to the vehicle body by means of a two-sided tape and wherein a plastic insert is received by the metallic carrier strip and provides the visible external ornamental surface of the molding system. Accordingly, a desired design change necessitates only a change in the plastic member which, owing to the nature of the material, can be readily and inexpensively provided relative to the requirements of the prior art rolled metallic moldings. Further, the metallic carrier strip can be fixedly fastened to the automotive vehicle at the end portion of the carrier strip and in such a manner that the fasteners are not visible from the external surface of the protective molding.

SUMMARY OF THE INVENTION

Briefly, a body side protective molding for attachment to the generally vertical surfaces of the sheet body of an automotive vehicle is provided. The system includes a metallic base carrier strip having a generally longitudinal dimension which is substantially greater than its transverse dimension. A layer of adhesive material is bonded at a first surface thereof to one side of the carrier strip over a substantial portion of the transverse dimension of the one side of the carrier strip. The opposite surface of the layer of adhesive material provides an exposed surface for adhesive attachment to a surface portion of the body after being pressed into engagement therewith. A plastic member is affixed to the other side of the carrier strip to complete the molding and to provide an ornamental surface thereof.

BRIEF DESCRIPTION OF THE DRAWING

The advantages of this invention will become more readily appreciated as the same becomes completely understood by reference to the following detailed description when taken in conjunction with the accompanying drawing wherein.

DETAILED DESCRIPTION

Figure 1:
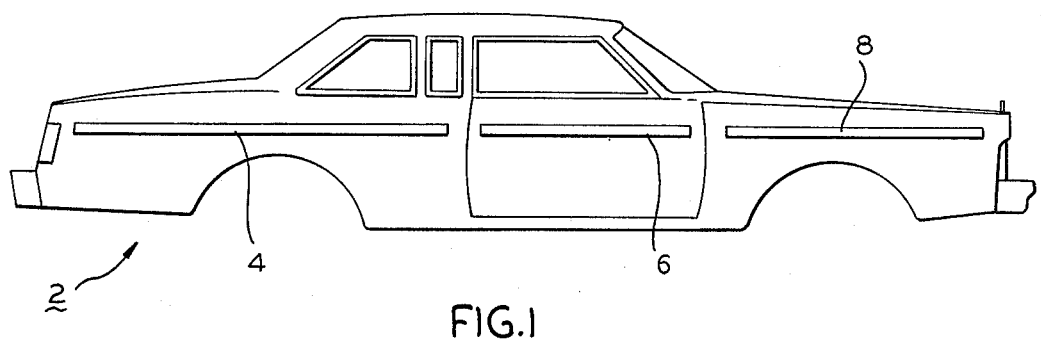
FIG. 1 is a pictorial plan view of an automotive vehicle illustrating body side protective moldings.

Referring now to FIG. 1, there is shown generally at 2 an exemplary automotive body including three body side protective moldings 4, 6 and 8. Molding 4 is a conventional quarter outside molding, molding 6 is a conventional door outside molding, and molding 8 is illustrated as a conventional fender outside molding. As is known, moldings 4, 6 and 8 protect the vertical sheet metal services of body 2 such as against the movement of a swinging door of an adjacent automotive vehicle. The body side protective molding system in accordance with the present invention is particularly adapted for such uses as illustrated in FIG. 1. However, as described more fully hereinafter, a given body side protective molding system, in accordance with the principles of the present invention, can be applied to any one of a number of applications such as the outline moldings provided on the upper portions of conventional truck bodies. Further, in protective molding system, in accordance with the present invention, can be provided in any desired structural configuration including various curved sections, and disposed on any given surface of an automotive vehicle.

Figure 2:
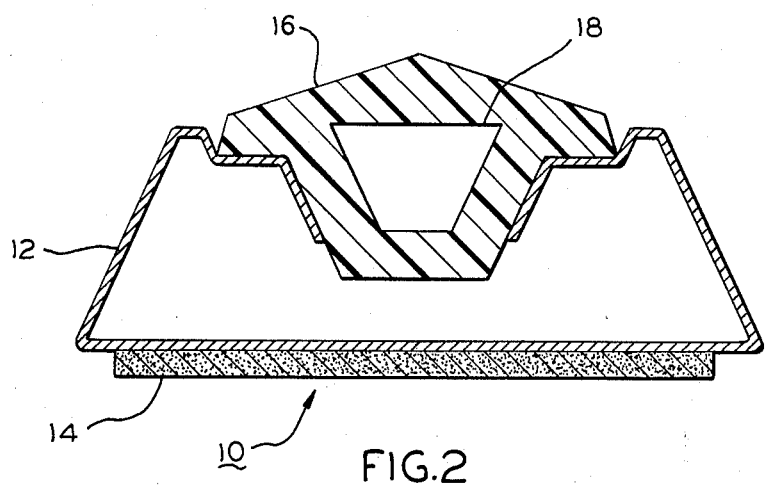
FIGS. 2-4 provide cross-sectional views of the body side protective molding system in accordance with the principles of the present invention.

Referring now to FIG. 2, there is shown generally at 10 a cross-sectional view of a body side protective molding system in accordance with the present invention. System 10 includes a metallic carrier strip 12 which is bonded, at an undersurface thereof, to a layer of adhesive tape 14 which may comprise a two-sided, stick-on neoprene tape or any other suitable material.

System 10 further includes a plastic insert 16 which is bonded or mechanically affixed to metallic carrier strip 12 by any one of a number of suitable means. Plastic insert 16 may be provided in any given shape, color and surface texture as is well known in the art. Metallic carrier strip 12 comprises a rolled or die formed section of stainless steel, anodized aluminum or any other suitable metallic material. In many applications, plastic member 16 is preferably provided with a hollow central portion or aperture 18 extending longitudinally through plastic insert 16 over its entire length. Aperture 18 facilitates a variety of additional functions such as a conduit passageway for carrying electrical conductors through molding 10 which are then used to power external devices such as a light source and lens disposed in molding 10 at intermediate point thereof. Such light sources can be used as night safety markers, to illuminate door locks, etc. In the embodiment of molding system 10 as illustrated in FIG. 2, plastic insert 16 is bonded to carrier strip 12 such as with an adhesive or by means heating either plastic insert 16 or carrier 12 to effect the bonding.

Figure 3:
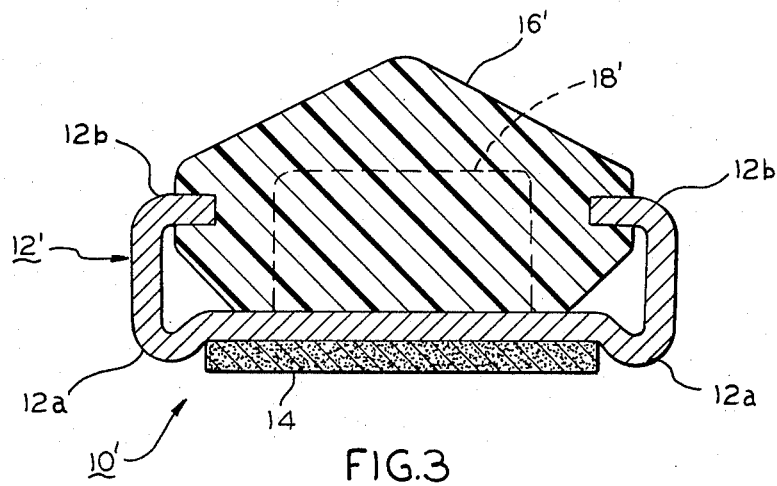

Referring now to FIG. 3, there is shown an alternate embodiment of the protective modling system in accordance with the present invention. Molding system 10' of FIG. 3 is similar to molding system 10 of FIG. 2 and accordingly like elements bear like reference numerals. It can be seen that metallic carrier strip 12' of FIG. 3 is provided as a generally U-shaped rolled channel section, the first turn 12a of which is provided along a given radius to increase the overall strength of carrier strip 12'. The upper portion of each leg of strip 12' is provided with an inwardly directed projection or ear 12b. Ears 12b facilitate assembly of carrier strip 12' with plastic insert 16' such as by a roll form assembly, or a slide assembly. Molding system 10' of FIG. 3 has the advantage that no adhesive or heat bonding is required. As with insert 16 of FIG. 2, plastic insert 16' can be provided with a plain or embossed surface or any other desired ornamental appearance including a texture surface. Similarly, plastic insert 16' can be provided with a hollow central portion 18' extending therethrough to accomodate other apparatus such as the electrical conductors of an auxiliary lighting system.

Figure 4:
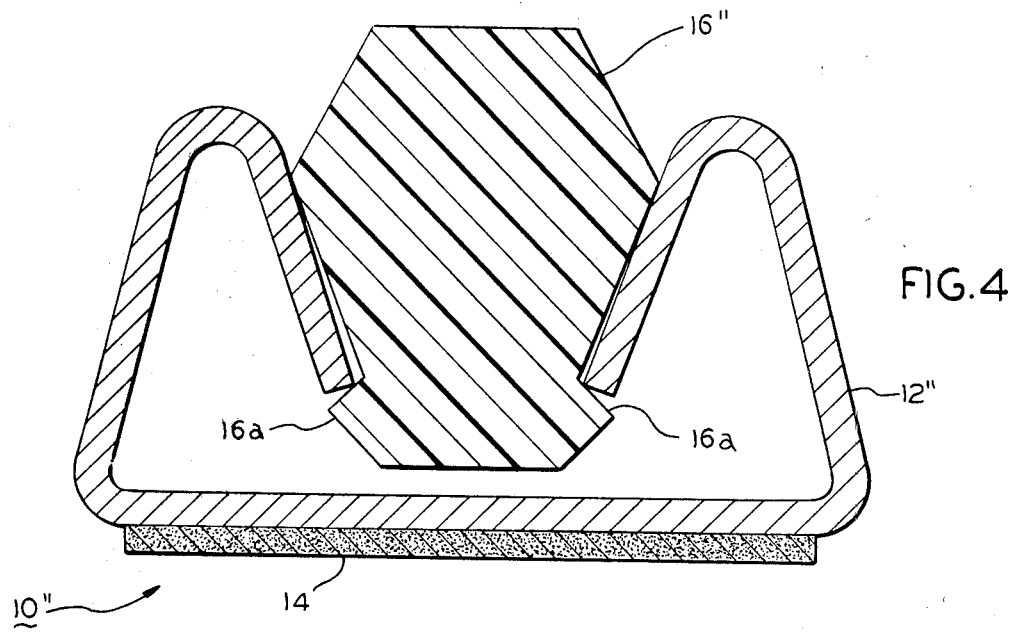

Referring now to FIG. 4, there is shown generally at 10" another alternate embodiment of the molding system in accordance with the principles of the present invention. Molding system 10" of FIG. 4 includes a plastic insert 16" having integral projecting ear portions 16a which function to secure plastic insert 16" to metallic carrier strip 12" in push-in/snap-on relationship therewith.

Figure 5:
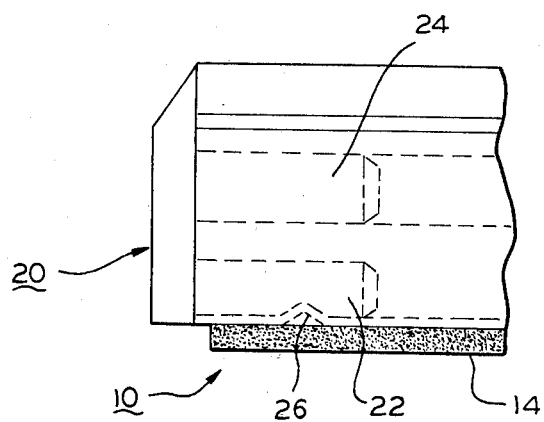
FIG. 5 is a fragmentary side view of an end portion of the protective molding shown in conjunction with an end plug inserted therein, in accordance with another feature of the present invention; and, FIG. 6a and FIG. 6b provide side and top views, respectively, of the metallic carrier strip in accordance with the present invention including a rigid fixed fastener means therewith.

Referring now to FIG. 5, there is shown a fragmentary side view of one end portion of a protective molding system, in accordance with the present invention, as illustrated in FIG. 2. Molding 10 of FIG. 5 includes an end plug shown generally at 20. End plug 20 functions to close the open channel end of molding system 10 and may comprise either a plastic, die-cast, forged or any other suitable material. Further, the end plug 20 may be chrome plated, or molded in any desired color, texture or ornamental configuration. End plug 20 includes a first projection 22 which extends into the open portion of carrier strip 12 and a second extended portion 24 which projects into the internal void 18 of plastic insert 16. It will be appreciated by those skilled in the art that since end plug 20 extends into plastic insert 16, a positive lock of insert-to-molding is provided once end plug 20 is staked in place. It will also be appreciated that this technique eliminates the die operations required to form a typical closed end of prior art molding strips and otherwise substitutes a single staking operation. Furthermore, the end staples and attendant fabricating operations, which are required of the prior art by side moldings, are eliminated in accordance with the present invention.

Figure 6A:
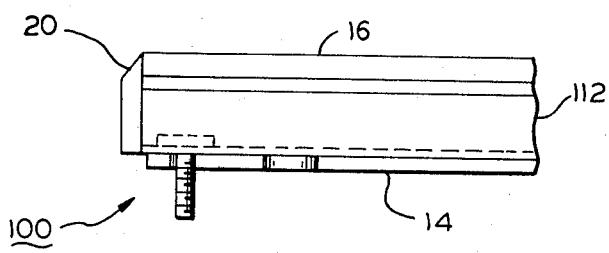
Figure 6B:
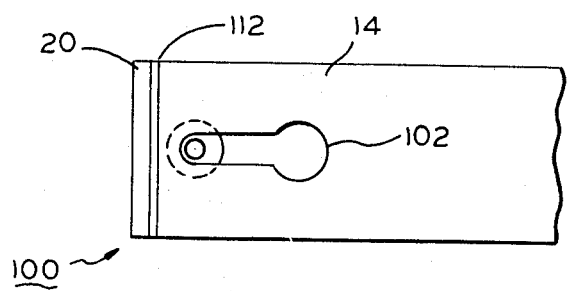

Referring now to FIGS. 6a and 6b there are shown, respectively, side and bottom views of a protective molding system 100 in accordance with the present invention. Molding system 100 includes a fastener 101 which is utilized to positively attach the ends of molding system 100 to the automotive vehicle body. These fasteners simplify the assembly plant installation of the moldings, in accordance with the present invention, and accordingly render system 100 less sensitive to poor undersurface preparation. Thus, the warranty expenses incurred because of molding bond failures are substantially eliminated.

What has been taught, then, is a body side protective molding system which exploits the concept of component interchangeability. That is, the present invention facilitates a choice of plastic inserts to revise the molding appearance without affecting the base metal carrier and other components of the system. Accordingly, the molding system can be exploited for either a single automotive vehicle line, including the entire range of models within that line, or to multiple automotive vehicle lines without incurring the penalty for new tooling with each system.

The forms of the inventions illustrated and described herein are but preferred embodiments of these teachings. They are shown as illustrations of the inventive concepts, however, rather than by way of limitation, and it is pointed out that various modifications and alterations may be indulged in within the scope of the appended claims.

What is claimed is:

1. A body side protective molding for attachment to the generally vertical surfaces of the sheet body for an automotive vehicle comprising, in combination:

a continuous metallic generally U-shaped base carrier strip having a generally longitudinal dimension substantially greater than its transverse dimension and having spaced leg portions projecting away from a continuous generally flat bottom portion connecting said leg portions said legs forming exterior longitudinally extending lateral side members of said molding;

a layer of adhesive material bonded at a first surface thereof to the flat side of said carrier strip over a substantial portion of the transverse dimension of said carrier strip and wherein the opposite surface of said layer of adhesive material provides an exposed surface for adhesive attachment to the surface portion of said body after being pressed into engagement therewith;

a plastic member mounted to said carrier strip and retainingly engaged by and between said leg portions to complete said molding and to provide an ornamental surface thereof the transverse width of said plastic member being significantly less than the transverse width of said carrier strip as defined by said exterior lateral side members and wherein said plastic member projects from and on opposite sides of a plane intersecting terminal points of the free ends of said leg portions; and, wherein said carrier strip is a rolled channel section each end of which receives a plug member which extends into the open passage of said channel section, and wherein said plastic member extends along said carrier strip and includes an internal enclosed passage at each of its ends to receive an extended portion of said plug therein, said enclosed passage extending into said plastic member a distance at least equal to the length of said extended portion.

2. The protective molding according to claim 1, wherein said carrier includes at each end thereof means for fixedly fastening said molding to said body independently of said layer of adhesive material.

* * * * *